United States Patent
Milione et al.

(10) Patent No.: US 9,813,155 B2
(45) Date of Patent: Nov. 7, 2017

(54) BI-DIRECTIONAL TRANSMISSION OVER AN ELLIPTICAL CORE OPTICAL FIBER

(71) Applicant: NEC Laboratories America, Inc., Princeton, NJ (US)

(72) Inventors: Giovanni Milione, Franklin Square, NY (US); Philip Nan Ji, Cranbury, NJ (US); Ezra Ip, Plainsboro, NJ (US); Shaoliang Zhang, Princeton, NJ (US); Yue-Kai Huang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/385,944

(22) Filed: Dec. 21, 2016

(65) Prior Publication Data

US 2017/0214463 A1    Jul. 27, 2017

Related U.S. Application Data

(60) Provisional application No. 62/286,010, filed on Jan. 22, 2016.

(51) Int. Cl.
| | |
|---|---|
| *H04B 10/00* | (2013.01) |
| *H04B 10/25* | (2013.01) |
| *H04J 14/02* | (2006.01) |
| *H04J 14/06* | (2006.01) |
| *H04L 5/14* | (2006.01) |
| *H04B 10/40* | (2013.01) |
| *H04B 7/0413* | (2017.01) |
| *H04B 10/2581* | (2013.01) |
| *H04J 14/00* | (2006.01) |

(52) U.S. Cl.
CPC ....... *H04B 10/2503* (2013.01); *H04B 7/0413* (2013.01); *H04B 10/2581* (2013.01); *H04B 10/40* (2013.01); *H04J 14/02* (2013.01); *H04J 14/06* (2013.01); *H04L 5/14* (2013.01)

(58) Field of Classification Search
CPC .............................. H04B 10/40; H04J 14/06
See application file for complete search history.

(56) References Cited

U.S. PATENT DOCUMENTS

2015/0229437 A1* 8/2015 Djordjevic .......... H04L 27/3405
714/776
2017/0201341 A1* 7/2017 Chowdhury ............ H04J 14/04

* cited by examiner

*Primary Examiner* — Daniel Dobson
(74) *Attorney, Agent, or Firm* — Joseph Kolodka

(57) ABSTRACT

Systems and methods for optical communication are disclosed that include communicating data using one or more transceiver pairs coupled to a spatial-multiplexer (S-MUX); performing bi-directional transmissions over an elliptical core optical fiber to a spatial-demultiplexer (S-DEMUX) using spatial modes to communicate data in either direction between two transceiver pairs with low crosstalk and without optical circulators or wavelength-division multiplexing (WDM); and communicating data from the S-DEMUX with g one or more transceiver pairs.

21 Claims, 8 Drawing Sheets

BI-DIRECTIONAL TRANSMISSION OVER AN ELLIPTICAL CORE OPTICAL FIBER

The present invention is related to bi-directional transmission over an elliptical core optical fiber.

Society's insatiable and exponentially increasing data needs due to, for example, cloud computing and the burgeoning "internet of things," is spurring the growth of short-haul optical fiber communication, the most prevalent example being data center networks. In data center networks, reducing the physical footprint of an optical fiber, and in turn cost, is paramount, as optical fiber count is significantly dense. This is due in great part to bi-directional transmission being ubiquitous.

Conventionally adopted strategies for bi-directional transmission are described below. For example, a fiber ribbon (single mode or multimode) is used as a "full-duplex." The optical fibers are used as parallel channels to transmit data at the same wavelength in either direction between a transceiver pair. The resulting physical footprint of bi-directional transmission becomes especially critical as required data transmission rates continually increase. Maintaining high data rates is achieved by increasing the number of optical fibers. However, increasing the number of optical fibers also increases the number of optical fiber splices and connections, further increasing cost.

Conventionally, to support bi-directional transmission, one of several strategies is adopted as a "full-duplex". One solution uses circulators to transmit data at the same wavelength over the same optical fiber in either direction between a transceiver pair (FIG. 1). This strategy minimizes the total fiber count needed to support a given number of transceiver pairs. However, it suffers from the near-far problem, as Rayleigh scattering (an inherent property of all optical fibers) of the strong L->R signal near the 'left' transmitter will appear as crosstalk for the weak R->L signal received by the 'left' receiver. The near-far problem generally precludes the use of bidirectional single fiber transmission over long haul distances, as the L->R signal may be 20-30 dB stronger than the R->L signal, making Rayleigh-induced near-end crosstalk (NEXT) problematic. However, the strategy is commonly used in short-haul transmission such as in access networks, as the powers of the L->R and R->L signals are more comparable even near the transceivers. This fiber keeps the total fiber count low. However, a circulator cannot be used to maintain high data transmission rates. Multiple optical fibers or WDM must be added to increase data transmission rates.

Another solution uses wavelength division multiplexing (WDM) to separate the channels in the L->R and R->L directions. FIG. 2 shows an example where $N\lambda/2$ transceiver pairs are supported, with $N\lambda/2$ wavelengths dedicated to transmission in the L->R direction, and $N\lambda/2$ wavelengths dedicated to transmission in the R->L direction. WDM multiplexers/demultiplexers are required in this setup. The fiber can be single- or multi-moded. Unlike (a), NEXT is not a problem since the channels are on different wavelengths. This strategy keeps the total fiber count low. However, WDM requires different lasers and possibly different detectors for the different wavelengths.

Yet another solution uses two fibers per transceiver pair (FIG. 3), with each fiber dedicated to transmission in only one direction. This strategy increases the total fiber count needed to support a given number of transceiver pairs. However, it also avoids the NEXT problem.

SUMMARY

Systems and methods for optical communication are disclosed that include communicating data using one or more transceiver pairs coupled to a spatial-multiplexer (S-MUX); performing bi-directional transmissions over an elliptical core optical fiber to a spatial-demultiplexer (S-DEMUX) using spatial modes to communicate data in either direction between two transceiver pairs with low crosstalk and without optical circulators or wavelength-division multiplexing (WDM); and communicating data from the S-DEMUX with g one or more transceiver pairs.

Advantages of the system may include one or more of the following. The system enables bi-directional transmission over a single optical fiber without circulators or WDM (described below) by using an elliptical core optical fiber as a "full-duplex." Its spatial modes are used as parallel channels to transmit data at the same wavelength in either direction between two transceiver pairs. As a result, the system achieves decreased physical footprint, and in turn decreased cost, while maintaining high data transmission rates, that is not possible using fiber ribbon or WDM (described below). It will also be shown that the system achieves this while maintaining low levels of computational complexity required in short-haul optical fiber communications. Additionally, the system can be used in conjunction with existing technologies. The system is especially advantageous in short-haul applications, such as, data-center networks where space is a constraint. For short-haul optical fiber communication, the system has decreased physical footprint, and in turn cost, associated with bi-directional transmission while maintaining high data transmission rates.

Other advantages may include one or more of the following:

(i) Decreased physical footprint of bi-directional transmission while maintaining high data transmission rates and low computational complexity
(ii) Fewer splices and connectors
(iii) Fewer lasers
(iv) Decreased cost
(v) Compatible with existing technology

DESCRIPTION

Figure 4:
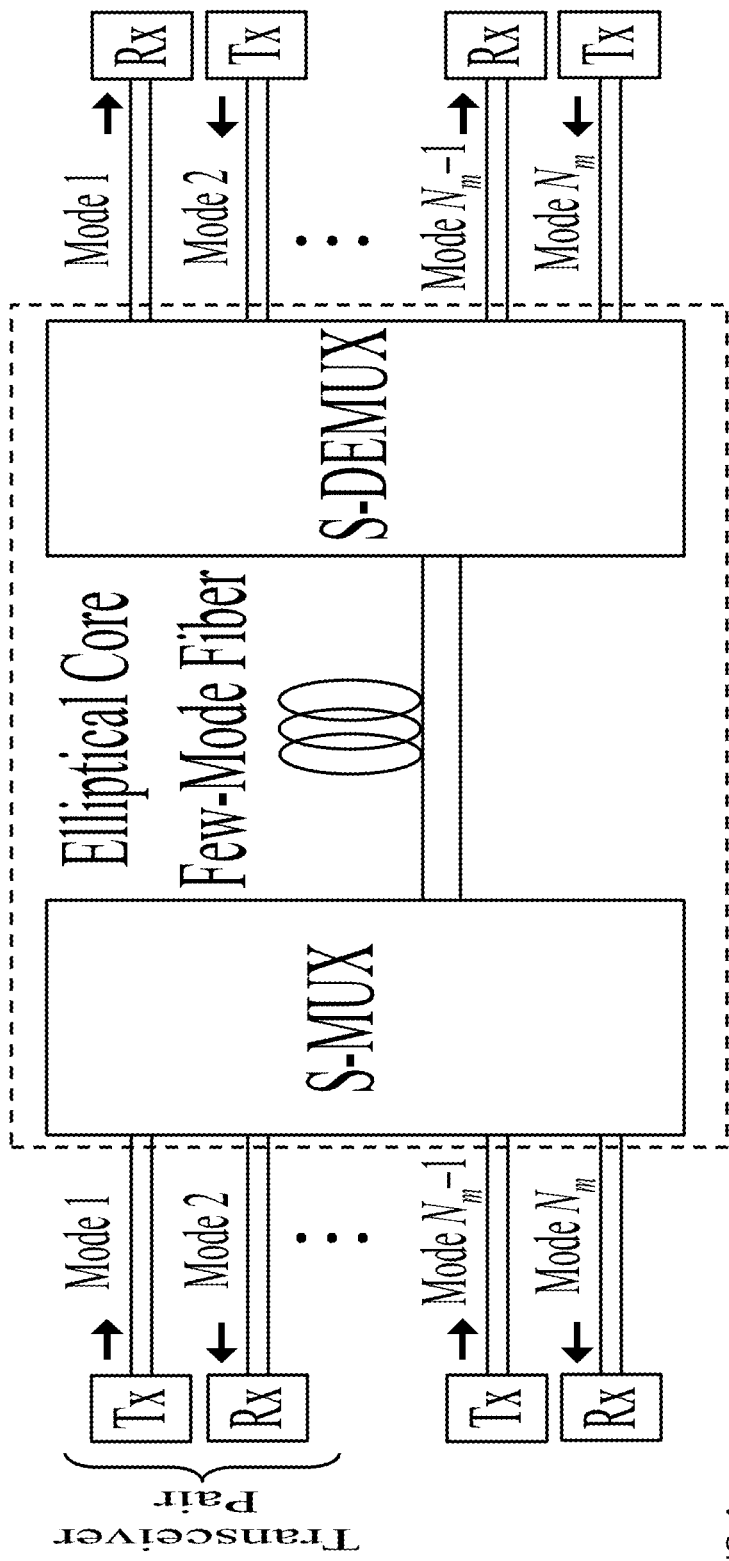
FIG. 4 shows an exemplary bidirectional transmission using an elliptical core fiber as a full-duplex.

FIG. 4 shows an exemplary bidirectional transmission using an elliptical core fiber in full-duplex communication. A plurality of transceiver pairs communicate with a Spatial-multiplexer (S-MUX). The transceiver pairs can be a multi-mode transceivers. The S-MUX communicates over an elliptical core few-mode fiber to a spatial-demultiplexer (S-DEMUX) which then communicates with one or more transceivers, which can be multimode transceivers.

The system enables bi-directional transmission over a single optical fiber by using an elliptical core optical fiber as a "full-duplex." Its spatial modes are used as parallel channels to transmit data at one wavelength in either direction between two transceiver pairs. As a result, the system achieves small physical footprint with decreased cost, while maintaining high data transmission rates. The system achieves these benefits while maintaining a low level of computational complexity required in short-haul optical fiber communication applications. Additionally, the system can be used in conjunction with existing technology, being especially advantageous in data-center networks where space is a constraint and reduced physical footprint must be achieved while maintaining high data transmission rates and low computational complexity.

Figure 5:
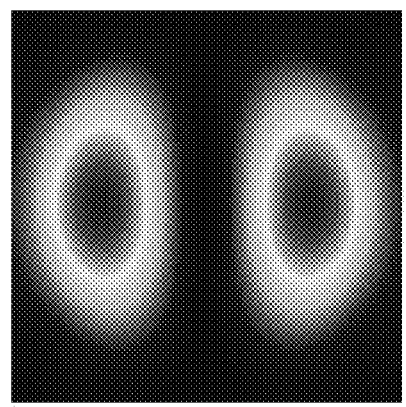
FIG. 5 shows examples of degenerate spatial modes which have the same propagation constant inside a circular-core few-mode fiber.
Figure 5:
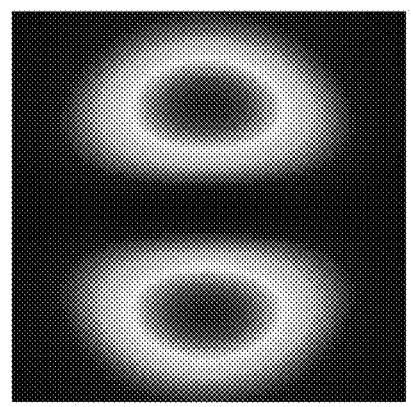

An EC-FMF is fundamentally different than a conventional circular-core FMF (CC-FMF) because asymmetry of the core induces large birefringence (i.e., difference in the effective index of propagation ($\Delta n_{eff}$)) between the odd- and even-orientations of the linearly polarized (LPmn where m<>0) modes that are normally degenerate in a CC-FMF (FIG. 5). FIG. 5 shows examples of degenerate spatial modes which have the same propagation constant inside a circular-core few-mode fiber, thus coupling continuously during transmission.

When two spatial modes are degenerate (i.e., they have the same effective index of propagation ($n_{eff}$)), they will couple strongly during propagation with coupling length on the order of meters or less. Even assuming the absence of mode coupling from modes of other mode groups (i.e., between $LP_{mn}$ and $LP_{kl}$, where m≠k or n≠l), the Jones matrix for the LPmn mode group with m≷0 will be a 4×4 matrix. This is analogous to two SMFs coupling continuously during transmission—each spatial mode behaves like a parallel single-mode fibers (SMF). Commercially available transceivers employing modulation formats and detection methods currently used in SMFs cannot be easily employed on the LPmn (m<>0) modes of a CC-FMF without either re-designing of the DSP, or complicated optical tracking techniques are required to uncouple the degenerate modes before detection. Redesigning of the DSP requires the addition of more computationally complex multiple-input-multiple-output (MIMO) DSP to mitigate mode coupling. The computational complexity associated with MIMO DSP when using it to mitigate mode coupling is prohibited in short-haul optical fiber communication, especially data center networks.

Figure 6:
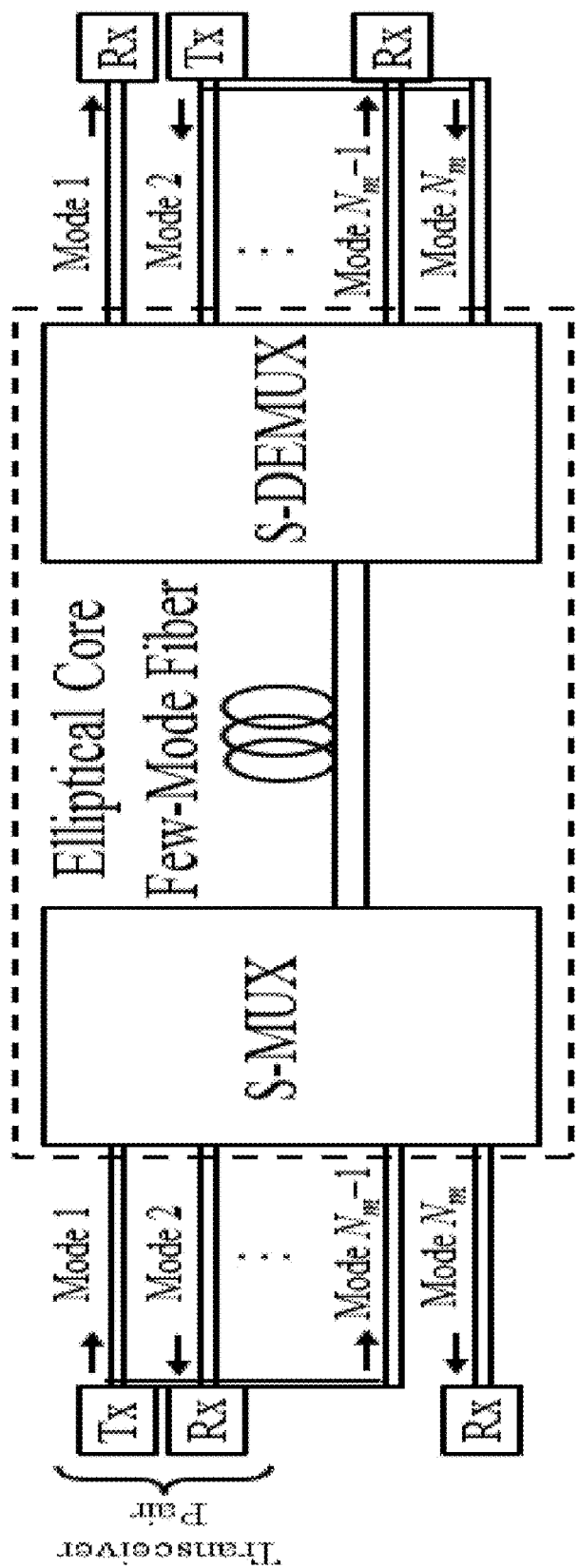
FIG. 6 shows an exemplary bidirectional transmission system using an elliptical core few-mode fiber full-duplex and one laser for each spatial mode.

FIG. 6 shows an exemplary bidirectional transmission system using an elliptical core few-mode fiber full-duplex and one laser for each spatial mode.

In an EC-FMF, birefringence causes $\Delta n_{eff}$ between the two orientations of the LPmn (m<>0) mode to be sufficiently large that they couple only weakly during propagation, with coupling length on the order of kilometers or more. The Jones matrix for the LPmn (m<>0) mode group is therefore a 4×4 matrix comprising two 2×2 block-diagonals, and is analogous to two non-coupling SMFs. The non-coupling property of the EC-MCF makes it compatible with existing optical transceivers developed for SMF, provided appropriate spatial (de)multiplexers are used to access the spatial modes of the EC-MCF.

Figure 7:
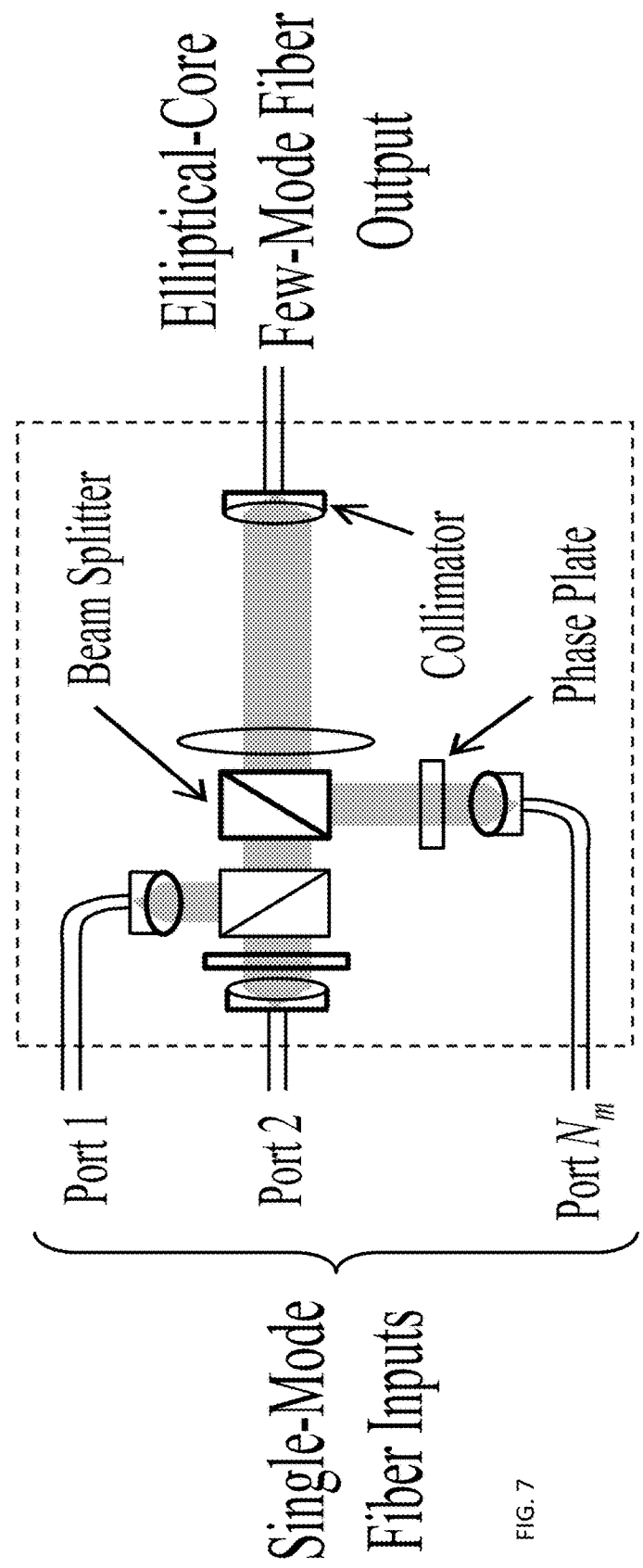
FIG. 7 shows a spatial multiplexer example using phase plates and passive beam splitters.
Figure 8:
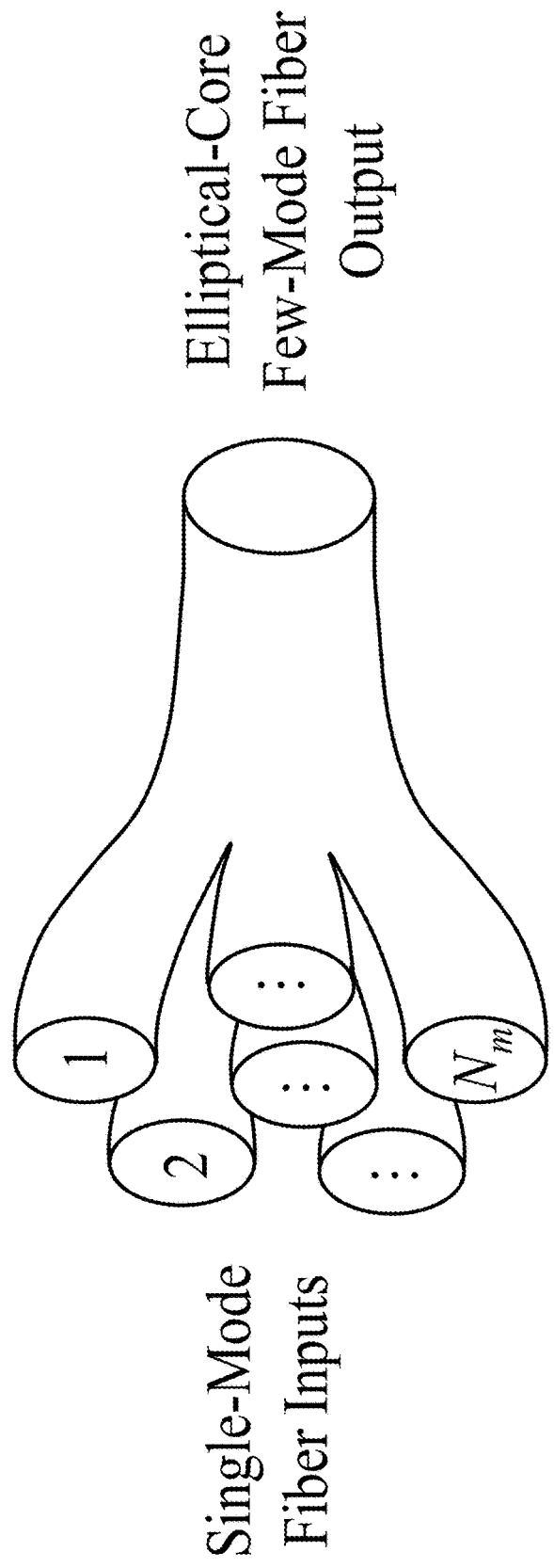
FIG. 8 shows a spatial multiplexer example using a mode-selective photonic lantern.

Spatial multiplexers (S-MUX) and demultiplexers (S-DEMUX) facilitate access to the spatial modes of the EC-MCF, as shown in FIGS. 4 and 5. They consist of Nm single-mode inputs and one multi-mode output. Each single-mode input uniquely addresses one of the $N_m$ spatial modes of the device output. The number of spatial modes addressable by the S-MUX/S-DEMUX should be less than or equal to the number of propagating modes in the EC-MCF. An ideal S-MUX/S-DEMUX has low insertion loss and low mode coupling (i.e., an input at port k of the device should excite only spatial mode k, with low crosstalk to any other spatial mode l<>k). Variations of such S-MUX/S-DEMUX have been demonstrated in literature. Two examples are shown in FIGS. 7 and 8. FIG. 7 shows a spatial multiplexer example using phase plates and passive beam splitters, while FIG. 8 shows a spatial multiplexer example using a mode-selective photonic lantern. The device in FIG. 7 uses collimators, phase plates and passive splitters; while the device in FIG. 8 uses a mode-selective photonic lantern. Both of these devices can be miniaturized as suitable for a given application.

At the system level, half of the Nm spatial modes of the EC-FMF (e.g., the odd-numbered modes in FIGS. 4 and 5) are assigned for transmission in the L->R direction; while the other half of the modes of the EC-FMF (e.g., the even-numbered modes in FIGS. 4 and 5) are assigned for transmission in the R->L direction. The system thus supports $N_m/2$ transceiver pairs, where the direction of the various propagating signals are shown in FIG. 4. Different spatial modes can be assigned to different transceiver pairs.

As shown in FIG. 6, the $N_m$ spatial modes of the EC-FMF share can share a single laser at a single wavelength. In this case, the same laser can be split $N_m$ times and modulated $N_m$ times as $N_m$ independent signals for $N_m$ spatial modes.

Additionally, the use of an elliptical core optical fiber as a full-duplex for bi-directional transmission can be used with existing technology:

(i) Each spatial mode can also carry a WDM signal (ii) Each spatial mode can also carry a polarization division multiplexing (PDM) signal. In the case of PDM, the computational complexity is still minimized, only requiring 2×2 MIMO DSP.

(iii) The use of an elliptical core optical fiber as a full-duplex for bi-directional transmission can also be used with fiber ribbons where each fiber in the ribbon is an elliptical core optical fiber. Also, each core of a multicore optical fiber can be an elliptical core optical fiber.

The system enables bi-directional transmission over a single optical fiber by using an elliptical core optical fiber as a "full-duplex." Its spatial modes are used to transmit data in either direction between two transceiver pairs. As a result, the system achieves decreased physical footprint, and in turn decreased cost, while maintaining high data transmission rates. It will also be shown that the system achieves this while maintaining low levels of computational complexity required in short-haul optical fiber communications.

Bidirectional transmission over multi-mode fibers (MMF) has been reported before, but used WDM to separate the signals in the L->R (λ1) and R->L (λ2) directions. In the current system, the signals in the L->R and R->L directions propagate in different spatial modes, so they can be at the same wavelength, and no circulators are required. Additionally, the current system can be used with WDM, as bidirectional transmission is not in conflict with WDM. In the current system, birefringence in the EC-FMF causes the two spatial orientations of $LP_{mn}(m\neq 0)$ modes to be non-degenerate so they do not couple during transmission. Thus, the current system is compatible with commercially available transceivers developed for SMF. Also, the system can be used in conjunction with WDM and fiber ribbons. The system offers the ability to facilitate bidirectional transmission with low NEXT without optical circulators or WDM, and the replacement of a SMF ribbon with an EC-FMF.

Figure 9:
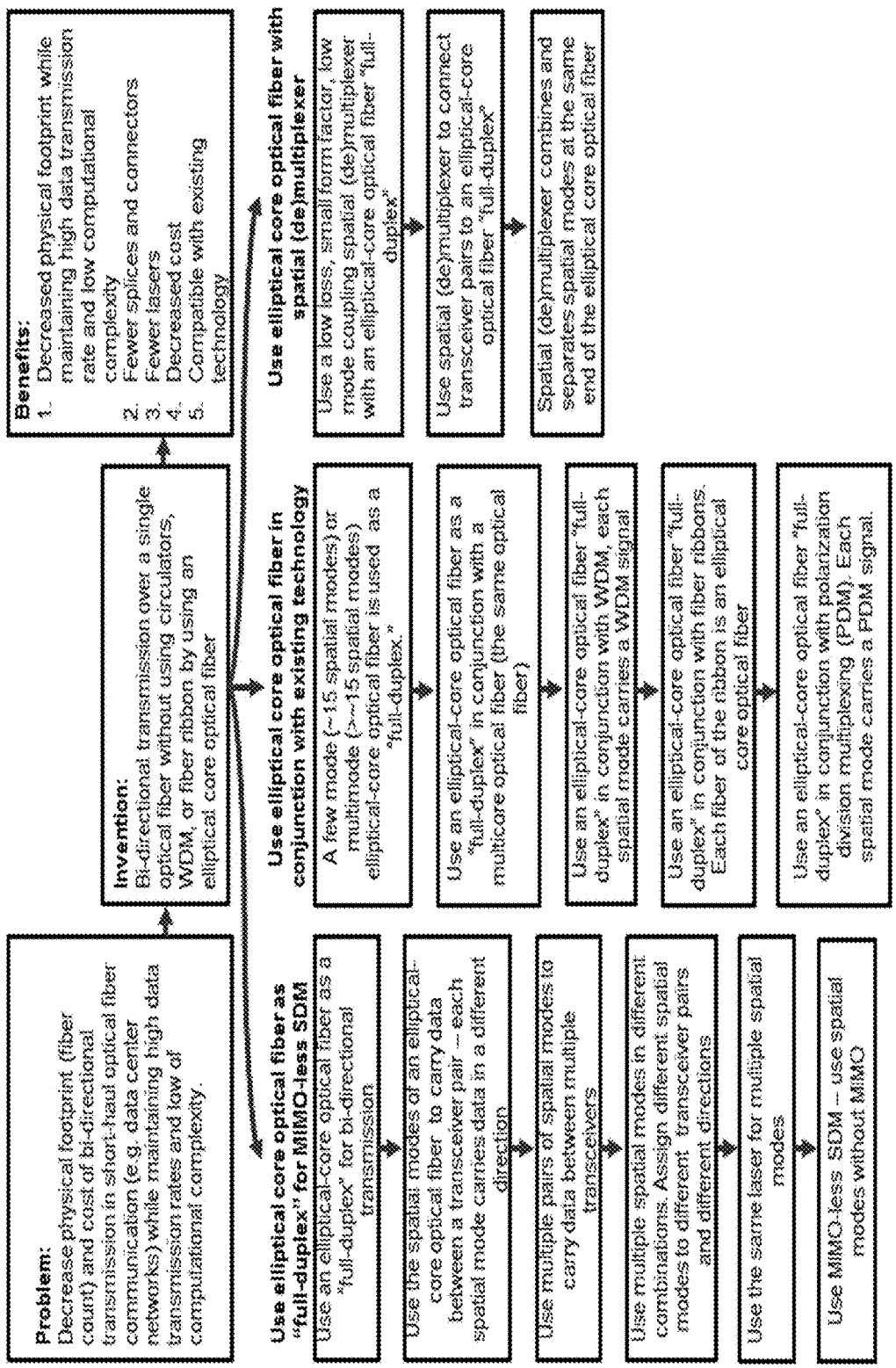
FIG. 9 shows exemplary systems and methods for optical communication that perform bi-directional transmissions over an elliptical core optical fiber to a spatial-demultiplexer (S-DEMUX) using spatial modes to communicate data in either direction between two transceiver pairs with low crosstalk and without optical circulators or wavelength-division multiplexing (WDM).
Figure 10:
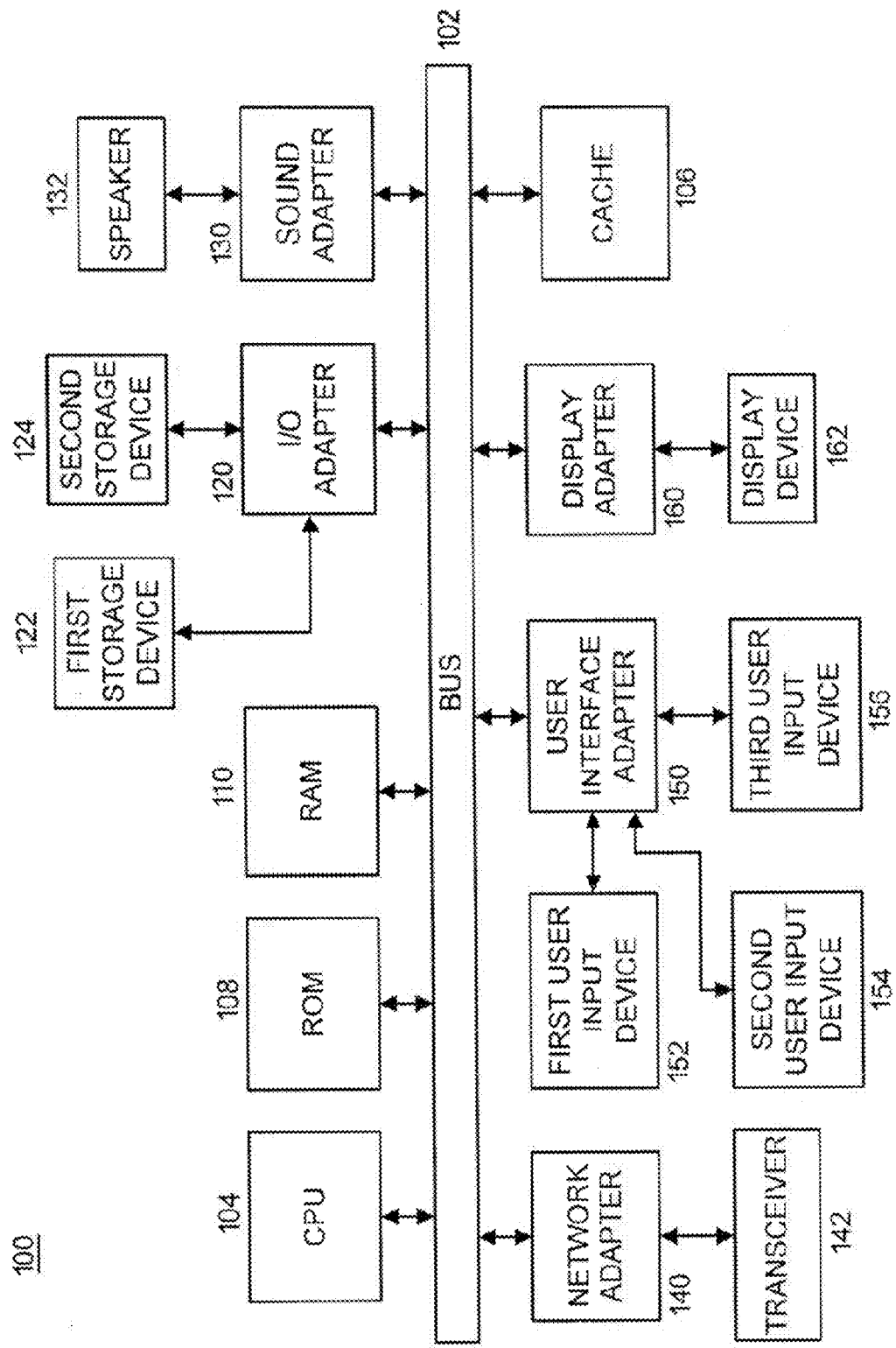
FIG. 10 shows an exemplary computing system in FIG. 1.

FIG. 9 shows exemplary systems and methods for optical communication that perform bi-directional transmissions over an elliptical core optical fiber to a spatial-demultiplexer (S-DEMUX) using spatial modes to communicate data in either direction between two transceiver pairs with low crosstalk and without optical circulators or wavelength-division multiplexing (WDM).

Figure 1:
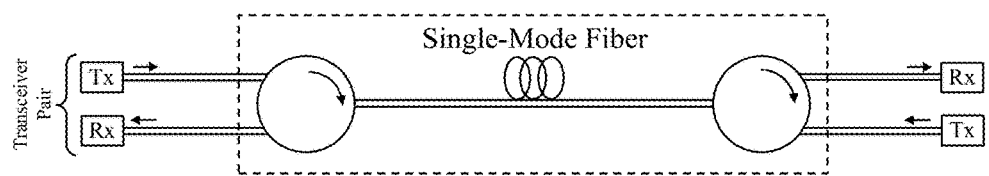
FIG. 1 shows an exemplary bidirectional transmission using a single single-mode optical fiber that uses a circulator as a full-duplex.
Figure 2:
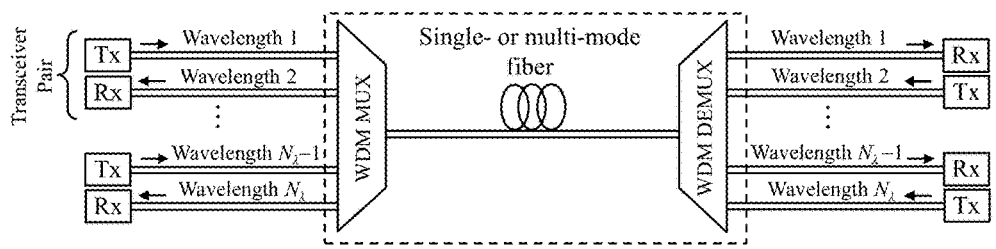
FIG. 2 shows an exemplary bidirectional transmission using a single optical fiber that uses WDM as a full-duplex.
Figure 3:
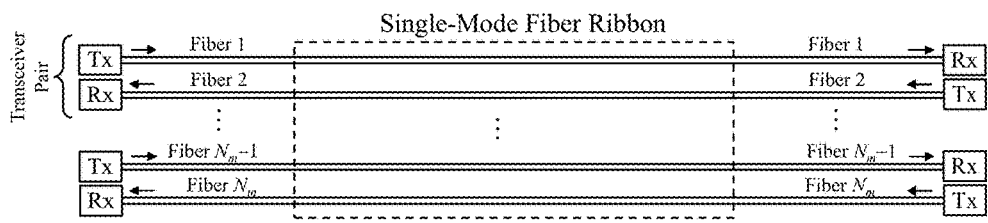
FIG. 3 shows an exemplary bidirectional transmission using a fiber ribbon as a full-duplex.

Although the EC-FMF is a single fiber, it comprises of a multiplicity of parallel spatial channels. So long as the spatial channels can be accessed with low crosstalk, and none of the spatial channels (modes) is assigned to support simultaneous bidirectional transmission, circulators are not required. The replacement of an SMF ribbon by an EC-FMF is possible because the EC-FMF is functionally equivalent to a bank of parallel SMF shown in FIG. 3. Alternatively, the system in FIG. 4 can also be thought of as a "spatial" equivalent of the "wavelength"-based system shown in FIG. 2. While bidirectional transmission using an EC-FMF may potentially suffer from the NEXT problem (which is absent when using WDM (FIG. 2) or an SMF ribbon (FIG. 3)), the system is optimal for short-reach applications where the power levels of the L->R and R->L signals are comparable, even near the 'L' or 'R' bank of transceivers. Thus, crosstalk induced by Rayleigh scattering will have negligible impact on system performance.

Referring to the drawings in which like numerals represent the same or similar elements and initially to FIG. 9, a block diagram describing an exemplary processing system 100 to which the present principles may be applied is shown, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to a system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to the system bus 102 by the sound adapter 130. A transceiver 142 is operatively coupled to the system bus 102 by a network adapter 140. A display device 162 is operatively coupled to the system bus 102 by a display adapter 160. A first user input device 152, a second user input device 154, and a third user input device 156 are operatively coupled to the system bus 102 by a user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used while maintaining the spirit of the present principles. The user input devices 152, 154, and 156 can be the same type of user input device or different types of user input devices. The user input devices 152, 154, and 156 are used to input and output information to and from the system 100.

Of course, the processing system 100 may also include other elements (not shown), as readily contemplated by one of skill in the art, as well as omit certain elements. For example, various other input devices and/or output devices can be included in the processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations, can also be utilized as readily appreciated by one of ordinary skill in the art. These and other variations of the processing system 100 are readily contemplated by one of ordinary skill in the art given the teachings of the present principles provided herein.

It should be understood that embodiments described herein may be entirely hardware, or may include both hardware and software elements which includes, but is not limited to, firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for optical communication, comprising:
communicating data using one or more transceiver pairs coupled to a spatial-multiplexer (S-MUX);
performing bi-directional transmissions over an elliptical core optical fiber to a spatial-demultiplexer (S-DEMUX) using spatial modes to communicate data in either direction between two transceiver pairs with low crosstalk and without optical circulators or wavelength-division multiplexing (WDM); and
communicating data from the S-DEMUX with one or more transceiver pairs.

2. The method of claim 1, comprising using the elliptical core optical fiber in a full-duplex communication for multiple-input and multiple-output (MIMO)-less space-division multiplexing (SDM).

3. The method of claim 2, comprising using the elliptical core optical fiber in a full-duplex communication for bi-directional transmission.

4. The method of claim 2, comprising using one or more spatial modes of the elliptical core optical fiber to carry data between a transceiver pair.

5. The method of claim 4, wherein each spatial mode carries data in a different direction.

6. The method of claim 2, comprising using multiple pairs of spatial modes to carry data between multiple transceivers.

7. The method of claim 2, comprising using multiple spatial modes in different combinations.

8. The method of claim 7, comprising assigning different spatial modes to different transceiver pairs and different directions.

9. The method of claim 2, comprising using the laser for multiple spatial modes.

10. The method of claim 2, comprising using MIMO-less spatial modes.

11. The method of claim 1, comprising using elliptical core optical fiber with pre-existing communication systems.

12. The method of claim 11, wherein a few mode (about fifteen spatial modes) elliptical core optical fiber in a full-duplex communication.

13. The method of claim 11, wherein a multimode (greater than about fifteen spatial modes) elliptical core optical fiber in a full-duplex communication.

14. The method of claim 11, comprising using the fiber in full-duplex communication and wherein the fiber comprises a multicore optical fiber wherein at least one of the cores is elliptical.

15. The method of claim 11, comprising using the fiber in full duplex communication with wavelength-division multiplexing (WDM), wherein each spatial mode carries a WDM signal.

16. The method of claim 11, comprising using the fiber in full duplex communication with fiber ribbons and wherein each fiber of the ribbon comprises an elliptical core fiber.

17. The method of claim 11, comprising using an elliptical core optical fiber in full duplex communication with polarization division multiplexing (PDM), wherein each spatial mode carries a PDM signal.

18. The method of claim 1, comprising using the elliptical core optical fiber with a spatial multiplexer or demultiplexer.

19. The method of claim 18, comprising using a low loss, small form factor, low mode coupling spatial multiplexer or demultiplexer with an elliptical core optical fiber in full duplex communication.

20. The method of claim 18, comprising using a spatial multiplexer or demultiplexer to connect transceiver pairs to the elliptical core optical fiber in full duplex communication.

21. The method of claim 18, comprising using a spatial multiplexer or demultiplexer to combine and separate spatial modes at the same end of the elliptical core optical fiber.

* * * * *